United States Patent
Guillon

(10) Patent No.: US 12,050,583 B2
(45) Date of Patent: Jul. 30, 2024

(54) DIRECT-CHANNEL DATA UPDATE IN MEDIATED DATA EXCHANGE SYSTEMS

(71) Applicant: AMADEUS S.A.S., Biot (FR)

(72) Inventor: Nicolas Guillon, Mougins (FR)

(73) Assignee: AMADEUS S.A.S., Biot (FR)

( * ) Notice: Subject to any disclaimer, the term of this patent is extended or adjusted under 35 U.S.C. 154(b) by 31 days.

(21) Appl. No.: 17/574,387

(22) Filed: Jan. 12, 2022

(65) Prior Publication Data

US 2022/0237169 A1 Jul. 28, 2022

(30) Foreign Application Priority Data

Jan. 22, 2021 (EP) .................................. 21305082

(51) Int. Cl.
*G06F 16/00* (2019.01)
*G06F 16/215* (2019.01)
*G06F 16/23* (2019.01)
*G06F 21/33* (2013.01)

(52) U.S. Cl.
CPC .......... *G06F 16/235* (2019.01); *G06F 16/215* (2019.01); *G06F 16/2358* (2019.01); *G06F 21/335* (2013.01)

(58) Field of Classification Search
None
See application file for complete search history.

(56) References Cited

U.S. PATENT DOCUMENTS

| | | | |
|---|---|---|---|
| 6,941,285 B2* | 9/2005 | Sarcanin | G06Q 20/105 235/382 |
| 10,645,073 B1* | 5/2020 | Agarmore | G06F 21/30 |
| 11,151,115 B2* | 10/2021 | Fuchiwaki | G06F 16/2365 |
| 11,755,616 B2* | 9/2023 | Kleinpeter | H04L 9/3213 707/610 |
| 2005/0050104 A1* | 3/2005 | Kadyk | H04L 67/01 |
| 2011/0265161 A1 | 10/2011 | Flack et al. | |
| 2015/0032486 A1* | 1/2015 | Francois | G06Q 10/02 705/5 |
| 2017/0116585 A1 | 4/2017 | Rosano | |
| 2018/0211055 A1* | 7/2018 | Balijepalli | H04L 9/3247 |
| 2020/0028815 A1* | 1/2020 | He | H04L 51/52 |

(Continued)

FOREIGN PATENT DOCUMENTS

WO WO-2018169470 A1 * 9/2018 ............. G06F 21/31
WO WO-2020030539 A1 2/2020

*Primary Examiner* — Bai D Vu
(74) *Attorney, Agent, or Firm* — Perry + Currier Inc.

(57) ABSTRACT

A method in an orchestrator computing device includes: detecting a request to obtain updated data from a data source, for storage in a dataset corresponding to the data source; retrieving, from the dataset, a client identifier of the data source; generating a data collection message including (i) an input element to receive the updated data, (ii) a selectable submission element including a network identifier of the orchestrator computing device, and (iii) an authentication token; transmitting the data collection message for delivery to the data source using the client identifier; responsive to (i) entry of the updated data via the input element, and (ii) selection of the submission element at a client computing device associated with the data source, receiving, from the client computing device, the updated data and the authentication token; and updating the dataset to include the updated data.

13 Claims, 7 Drawing Sheets

(56) References Cited

U.S. PATENT DOCUMENTS

| | | |
|---|---|---|
| 2020/0082402 A1* | 3/2020 | Patel ................... G06Q 20/405 |
| 2020/0379971 A1 | 12/2020 | Hays et al. |
| 2020/0412806 A1* | 12/2020 | Largman ............... H04L 51/222 |
| 2022/0113954 A1* | 4/2022 | Valentine .................. G06F 8/65 |
| 2022/0171816 A1* | 6/2022 | Le Toquin ............. G06F 16/93 |
| 2022/0174066 A1* | 6/2022 | Rose ....................... H04L 63/08 |

\* cited by examiner

DIRECT-CHANNEL DATA UPDATE IN MEDIATED DATA EXCHANGE SYSTEMS

FIELD

The specification relates generally to mediated data exchange systems, and specifically to a system enabling direct-channel data updates in such systems.

BACKGROUND

Various processes, such as the authentication of a user account with a service, or the completion of a transaction, include the exchange of data between multiple entities. In some processes, data may originate at a source entity, such as a client device associated with the above-mentioned user account, or with the payer account in a transaction. The data may be a password, a security code on a payment card, personal identification data such as a passport number, a birthdate or the like, or some other form of identifying information that authenticates the source to the recipient of the data. The recipient, which may also be referred to as a target entity, may verify the identity of the source using such data, and/or may use the data to complete a further process.

In some cases, the exchange of data does not occur directly between the source and the target. Instead, the exchange is mediated on behalf of the source by a third party, sometimes without contemporaneous involvement of the source entity. For example, a mediator entity may interact with the target entity on behalf of the source entity, without any direct connection being established between the target entity and the source entity. In such systems, the mediator may store the above-mentioned data for use in interactions with the target entity. When such data is incomplete or incorrect (e.g. due to expiry or other changes), the process cannot continue until the mediator has obtained updated data directly from the source. Obtaining updated data from the source may be a manual process, separated from the system via which the data exchange is performed, and may therefore be time-consuming and error-prone, in addition to introducing either or both of processing delays, and privacy and/or security vulnerabilities.

SUMMARY

An aspect of the specification provides a method in an orchestrator computing device including: detecting a request to obtain updated data from a data source, for storage in a dataset corresponding to the data source; retrieving, from the dataset, a client identifier of the data source; generating a data collection message including (i) an input element to receive the updated data, (ii) a selectable submission element including a network identifier of the orchestrator computing device, and (iii) an authentication token; transmitting the data collection message for delivery to the data source using the client identifier; responsive to (i) entry of the updated data via the input element, and (ii) selection of the submission element at a client computing device associated with the data source, receiving, from the client computing device, the updated data and the authentication token; and updating the dataset to include the updated data.

Another aspect of the specification provides a computing device, including: a memory; a communications interface; and a processor configured to: detect a request to obtain updated data from a data source, for storage in a dataset corresponding to the data source; retrieve, from the dataset, a client identifier of the data source; generate a data collection message including (i) an input element to receive the updated data, (ii) a selectable submission element including a network identifier of the computing device, and (iii) an authentication token; transmit the data collection message for delivery to the data source using the client identifier; responsive to (i) entry of the updated data via the input element, and (ii) selection of the submission element at a client computing device associated with the data source, receive, from the client computing device, the updated data and the authentication token; and update the dataset to include the updated data.

BRIEF DESCRIPTIONS OF THE DRAWINGS

Embodiments are described with reference to the following figures.

DETAILED DESCRIPTION

Figure 1:
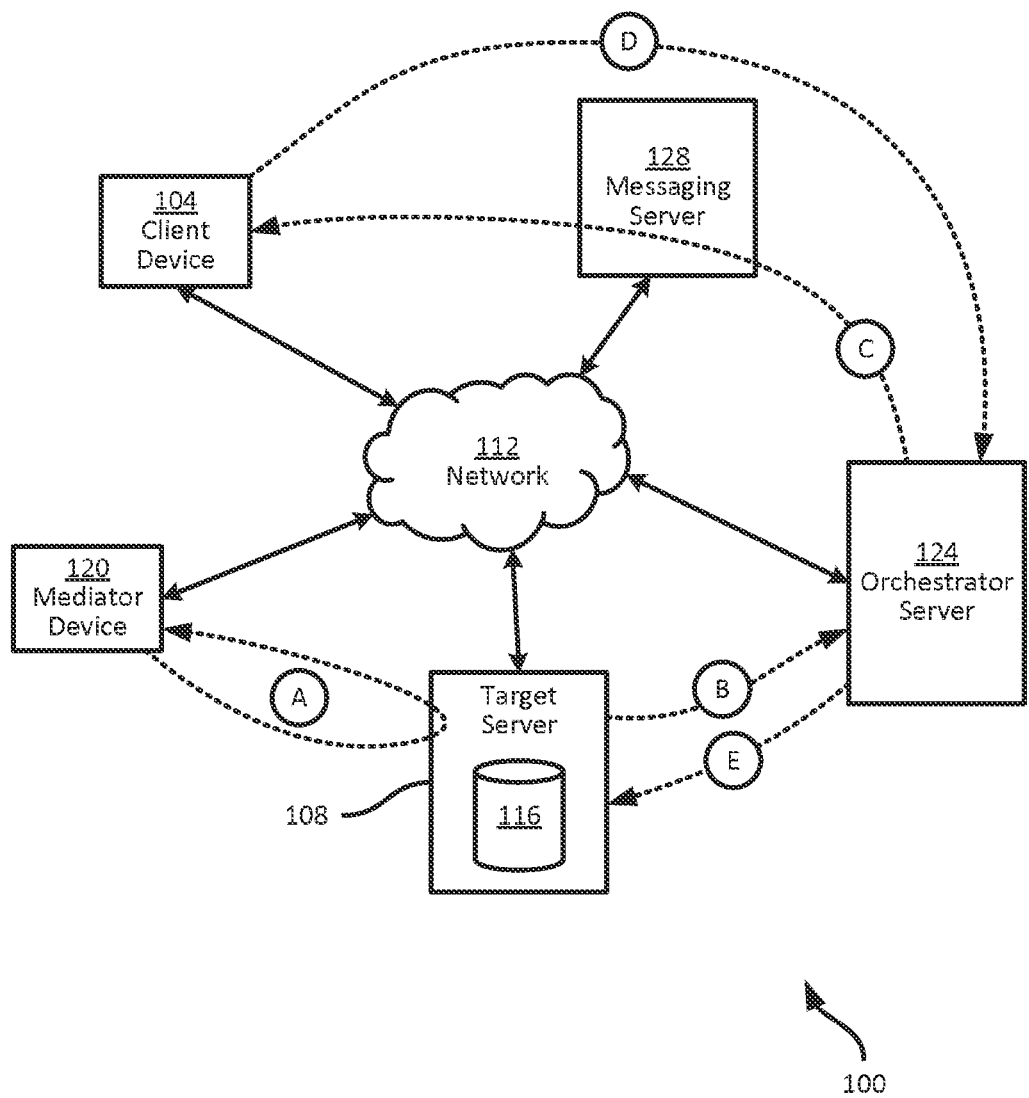
FIG. 1 is a diagram of a system for direct-channel data update in mediated systems.

FIG. 1 depicts a mediated data exchange system 100. The system 100 is referred to as a mediated data exchange system because data exchanges on behalf of a given entity, referred to herein as a source entity, can be conducted between two other entities—a mediator and a target—rather than between the source itself and the target. That is, the mediator entity mediates the data exchange on behalf of the source. The entities referred to above are illustrated in FIG. 1 by way of computing devices associated with the respective entities. Thus, the source entity is represented by a client device 104, which may be any suitable computing device (e.g. a smartphone, a laptop or desktop computer, and the like).

The target entity is represented in FIG. 1. by a target server 108. The client device 104 and the target server 108 are each connected to a network 112, which can include any suitable combination of local and wide-area networks, including the Internet. The target server 108 implements a service accessible by the client device 104, or on behalf of the client device 104, and maintains a repository 116 of data used in providing the service.

A wide variety of services may be implemented by the server 108, and the nature of the data in the repository 116 can therefore also vary widely. In the examples discussed below, the target server 108 implements a booking service for travel-related products (e.g. flights, hotel reservations, and the like). The repository 116 therefore contains a plurality of datasets, each corresponding to a given source entity such as an individual traveler, a business, or the like. That is, the repository 116 contains at least a dataset corresponding to the client device 104.

The dataset corresponding to the client device 104 in the repository 116 can include, for example, identifying information such as a name, a physical (i.e. mailing) address, a passport number, a client identifier such as an email address, payment or other account information such as a credit card number or loyalty card number, and the like. The dataset may also be referred to as a profile corresponding to the client device 104. The profile is retrieved for use locally at the target server 108 or for transmission to another device (not shown) to complete a booking, e.g. for a flight or other travel product.

As noted earlier, data exchanges in the system 100 can be mediated, in that an exchange to book a flight or other travel-related product or service on behalf of the client device 104 may be initiated and guided by an entity other than the client device 104 itself. In particular, the system 100 includes a mediator computing device 120 connected to the network 112, configured to initiate the data exchange with the target server 108 on behalf of the client device 104. As will be apparent to those skilled in the art, the mediator device 120 may be operated by a travel agent or other intermediate entity configured to interact with the target server 108 on behalf of the source entity. The mediator device 120 may also, in some examples, by an automated system rather than a device with a human operator as noted above. Indeed, in some examples the target server 108 may not be configured to enable initiation of such an exchange directly with the client device 104.

To perform the data exchange, e.g. to book a flight on behalf of the source entity associated with the client device 104, the mediator device 120 may provide an identifier of the source entity, such as a name, email address or the like, to the target server 108. The identifier enables the target server 108 to retrieve the relevant profile from the repository 116 for use in completing the booking. The profile may, however, include incomplete or deprecated portions in some examples. For example, a mailing address of the source entity may be incomplete, a passport currently stored in the profile may be expired, or the like.

When an operator of the mediator device 120 determines that the profile requires updating before the process can continue, in previous systems the operator of the mediator device 120 contacts the source entity manually, e.g. by composing an email, placing a phone call, or the like. The operator of the mediator device 120 thereby collects updated data from the source entity, and transcribes the updated data into a message or interface hosted by the target server 108 to update the repository 116. The above update process, however, introduces several weaknesses in previous systems. For example, the manual process of collecting and transcribing updated data can lead to transcription errors. Further, the above process passes potentially sensitive data through the mediator device 120 before transmission to the target server 108. The data may therefore be misappropriated if the mediator device 120 is compromised.

The system 100 therefore implements additional functionality to insulate the updated data originating at the source entity from misappropriation at the mediator device 120, while still permitting the mediator device 120 to initiate the update operation. This arrangement, as will be seen below, enables the system 100 to maintain a configuration in which the client device 104 need not manage the contents of the repository 116 directly by, for example, logging into a client portal hosted by the target server 108.

In particular, the system 100 also includes an orchestrator server 124 connected to the network 112. In some examples, the orchestrator server 124 can be integrated with the target server 108, e.g. as an additional functional module executed at the server 108. In the present example, however the orchestrator server 124 is shown separately for clarity. The orchestrator server 124, in brief, detects requests to obtain updated source data, e.g. generated by the target server 108. Having detected such a request, the orchestrator server 124 generates and sends a data collection message to the client device 104. The data collection message contains certain dynamic elements enabling entry of updated data at the client device 104 and passage of the updated data directly back to the orchestrator server 124. For example, the data collection message may be a dynamic email message. The orchestrator server 124 can then write the updated data to the repository 116. As a result, updated data may be obtained directly from the client device 104, rather than through the mediator device 120.

Although the operation of the system 100 will be described below in greater detail, FIG. 1 provides a brief illustration of the direct-channel update provided by the system 100. In particular, in a first phase A, the mediator device 120 can retrieve the profile associated with the client device 104 from the repository 116, e.g. in preparation to book a flight or initiate any other suitable process on behalf of the client device 104.

The operator of the mediator device 120, or an autonomous process executed by the mediator device 120, may determine that data in the profile is missing (i.e. incomplete) or invalid, e.g. due to expiry. The mediator device 120 may then send an instruction to the target server 108 indicating which portion(s) of the profile require updating. In some examples, the target server 108 itself may identify portions of a profile requiring updates. In any event, the target server 108 generates an update request and transmits the request to the orchestrator server 124 in phase B. Based on the request, the orchestrator server 124 generates and sends a data collection message at phase C via a messaging server 128. The messaging server 128 can include an email server or any other suitable form of messaging server, including instant messaging and the like.

The client device 104, having received the data collection message, can enter and submit updated data directly within the data collection message, for return to the orchestrator server 124 in a phase D. Notably, as illustrated in FIG. 1, the return of the updated data need not pass through the messaging server 128. That is the data collection message can include information enabling the return of collected data directly to the orchestrator server 124.

Upon receipt of the updated data, the orchestrator server 124, in a phase E, updates the repository 116 with the updated data. The mediator device 120 may also be notified by either the target server 108 or the orchestrator server 124 once the updated data is stored at the repository 116.

Before discussing the direct-channel update process summarized above in greater detail, certain internal components of the target server 108 and the orchestrator server 124 will be described, with reference to FIGS. 2A and 2B.

Figure 2A:
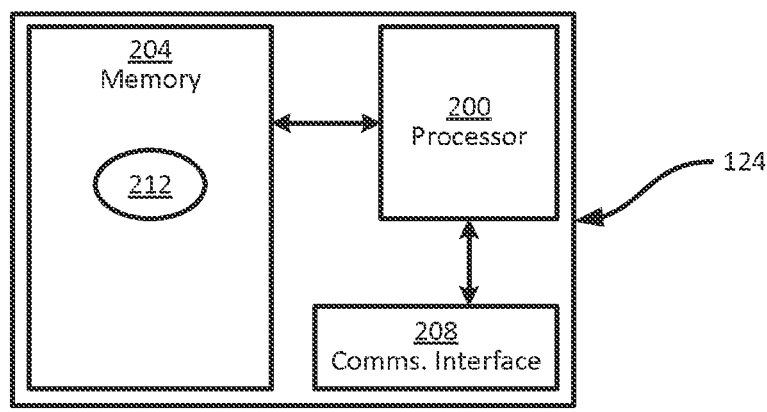
FIG. 2A is a diagram illustrating certain internal components of the orchestrator server of FIG. 1.

Referring in particular to FIG. 2A, the orchestrator server 124 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communications interface 208, which enables the orchestrator server 124 to communicate with the other computing devices of the system 100 via the network 112. The communications interface 208 therefore includes any necessary components (e.g. network interface controllers (NICs), radio units, and the like) to communicate via the network 112. The specific components of the communications interface 208 are selected based on upon the nature of the network 112. The orchestrator server 124 can also include input and output devices connected to the processor 200, such as keyboards, mice, displays, and the like (not shown).

The components of the orchestrator server 124 mentioned above can be deployed in a single enclosure, or in a distributed format. In some examples, therefore, the orchestrator server 124 includes a plurality of processors, either sharing the memory 204 and communications interface 208, or each having distinct associated memories and communications interfaces.

The memory 204 stores a plurality of computer-readable programming instructions, executable by the processor 200, in the form of various applications, including a data collection application 212. As will be understood by those skilled in the art, the processor 200 executes the instructions of the application 212 (and any other suitable applications) in order to perform various actions defined by the instructions contained therein. In the description below, the processor 200, and more generally the orchestrator server 124, are said to be configured to perform those actions. It will be understood that they are so configured via the execution (by the processor 200) of the instructions of the applications stored in memory 204. Execution of the data collection application 212, as will be discussed below, configures the orchestrator server 124, as summarized in connection with FIG. 1, to detect a request for updated data, communicate with the client device 104 to obtain such updated data, and to apply any received updated data to the repository 116.

The data collection application 212 also configures the orchestrator server 124, as part of the above process, to generate data collection messages for transmission to the client device 104. Various types of messages may be employed for this purpose, including email messages. In particular, in some examples the orchestrator server 124 can generate email messages containing interactive elements, such as "actionable messages" for use within Microsoft™ Outlook email infrastructure. In such implementations, the data collection messages can also be referred to as dynamic email messages, and are addressed via a client identifier such as an email address. Similar interactive elements may also be provided via other messaging infrastructure, including other email providers as well as instant messaging providers that deploy such interactive elements.

The data collection application 212 can also implement one or more application programming interfaces (APIs) exposed to other computing devices via the network 112, including the target server 108 and the client device 104, used to implement the data collection process.

Figure 2B:
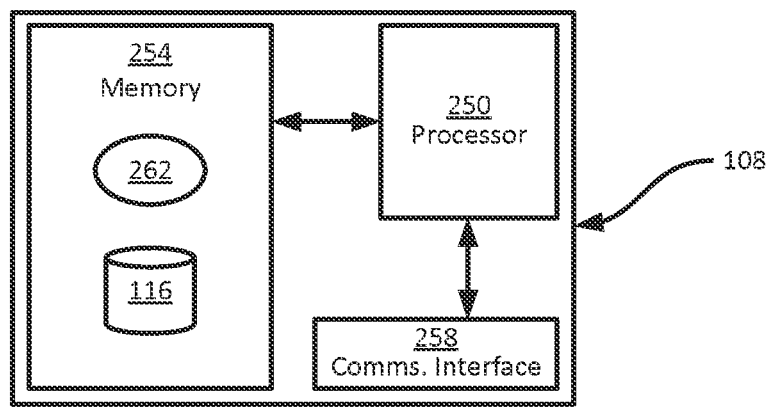
FIG. 2B is a diagram illustrating certain internal components of the target server of FIG. 1.

Turning to FIG. 2B, the target server 108 includes at least one processor 250, such as a central processing unit (CPU) or the like. The processor 250 is interconnected with a memory 254, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 250 and the memory 254 are generally comprised of one or more integrated circuits (ICs).

The processor 250 is also interconnected with a communications interface 258, which enables the target server 108 to communicate with the other computing devices of the system 100 via the network 112. The communications interface 258 therefore includes any necessary components (e.g. network interface controllers (NICs), radio units, and the like) to communicate via the network 112. The specific components of the communications interface 258 are selected based on upon the nature of the network 112. The target server 108 can also include input and output devices connected to the processor 250, such as keyboards, mice, displays, and the like (not shown).

The components of the target server 108 mentioned above can be deployed in a single enclosure, or in a distributed format. In some examples, therefore, the target server 108 includes a plurality of processors, either sharing the memory 254 and communications interface 258, or each having distinct associated memories and communications interfaces.

The memory 254 stores the repository 116 introduced in connection with FIG. 1, as well as a plurality of computer-readable programming instructions, executable by the processor 250. The instructions stored in the memory 254 include a profile application 262 (also referred to simply as the application 262). The profile application 262, when executed by the processor 250, configures the processor 250 (and the target server 108 more generally) to interact with the mediator device 120 to enable the mediator device 120 to view profile data from the repository 116, as well as to receive instructions from the mediator device 120 to obtain updated profile data and/or detect the need for such updates automatically.

In some embodiments, the functionality of the applications 212 and/or 262 may be implemented using pre-programmed hardware or firmware elements (e.g., application specific integrated circuits (ASICs), electrically erasable programmable read-only memories (EEPROMs), etc.), or other related components.

Figure 3:
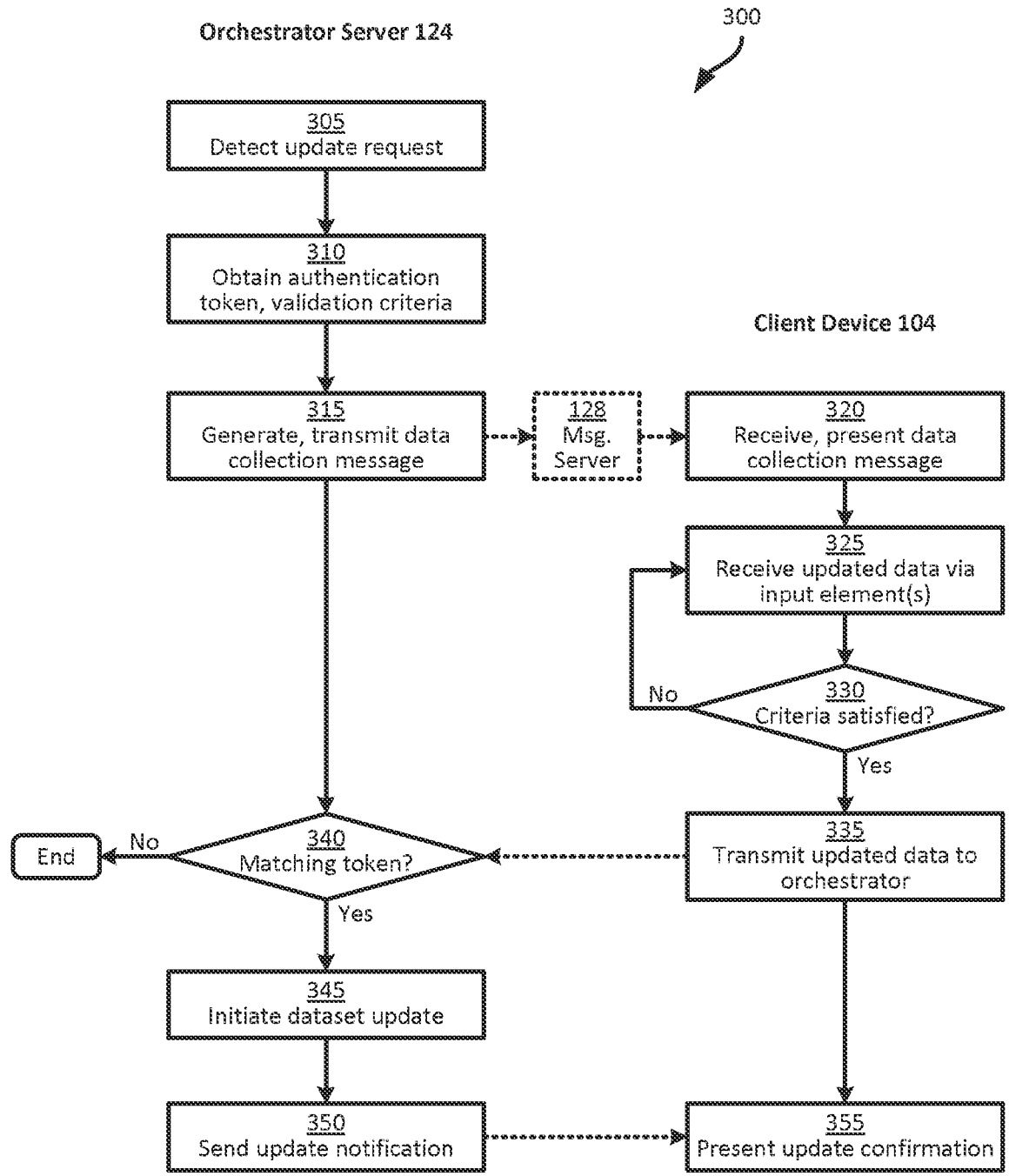
FIG. 3 is a flowchart of a method of collecting updated data from the client device of FIG. 1.

Turning now to FIG. 3, certain aspects of the operation of the system 100 will be described in greater detail. Specifically, FIG. 3 illustrates a method 300 of collecting updated profile data directly from the client device 104, in the context of a data exchange between the mediator device 120 and the target server 108. The method 300 will be described in conjunction with its performance within the system 100. In particular, certain blocks of the method 300 are performed by orchestrator server 124 via the execution of the data collection application 212 by the processor 200. Other blocks of the method 300 are performed by the client device 104, as indicated by the labels over the left and right portions of the flowchart.

At block 305, the orchestrator server 124 is configured to detect a request to obtain updated data from a source entity, in order to update a dataset (i.e. a profile) in the repository 116. The request can be detected in various ways at the orchestrator server 124. In some examples, detection of the request includes receiving the request at the orchestrator server 124 from the target server 108, which in turn generated the request as a result of an instruction from the mediator device 120.

Figure 4:
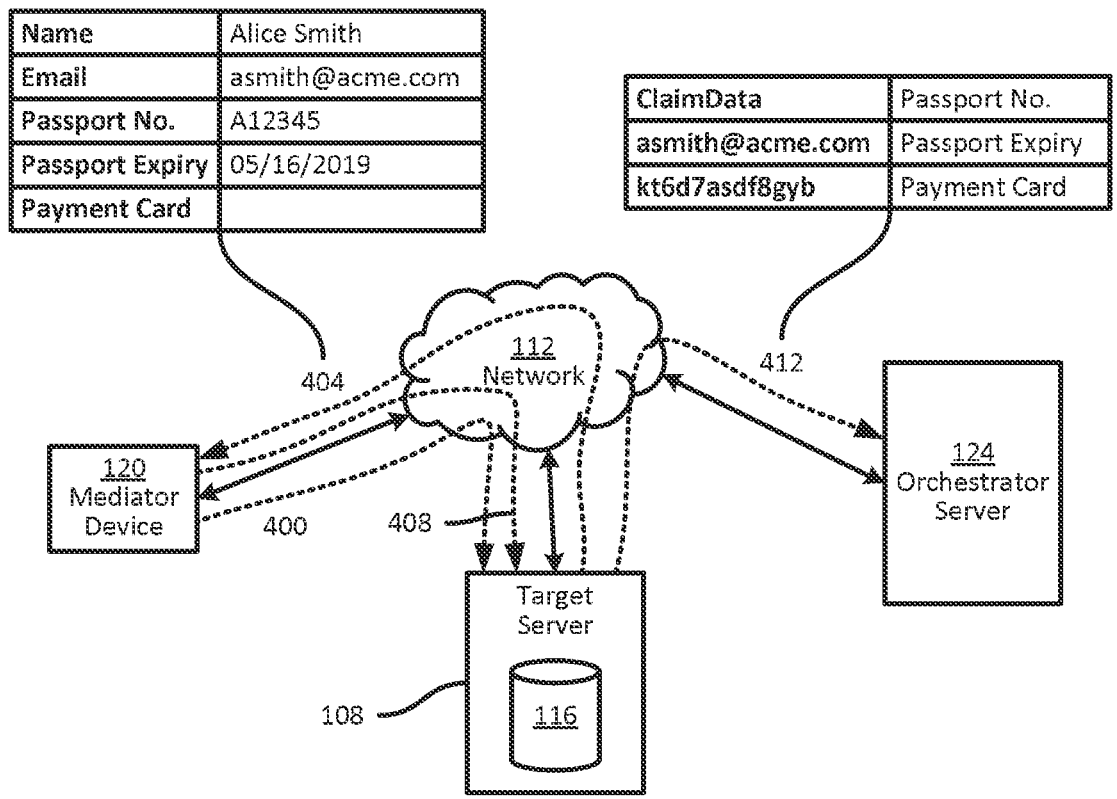
FIG. 4 is a diagram illustrating an example performance of block 305 of the method of FIG. 3.

For example, turning to FIG. 4, a portion of the system 100 is shown to illustrate an example performance of block 305. Specifically, the mediator device 120 initiates, via a request 400, a communication session with the target server 108, e.g. to book a flight or other product on behalf of the client device 104. The request 400 may include an identifier associated with the client device 104, such as a name, email address, or the like. Using the identifier, the target server 108 retrieves the relevant dataset from the repository 116, and returns at least a portion of the dataset to the mediator device 120. For example, FIG. 4 illustrates a dataset 404 being returned to the mediator device 120, including various fields associated with the client device 104 (or with the source entity associated with the client device 104). In particular, the dataset 404 includes a name of the source entity ("Alice Smith"), an email address of the source entity ("asmith@acme.com"), a passport number and expiry date, and a payment card number (e.g. a credit card number).

More generally, the specific nature of the data exchanged between the mediator device 120 and the target server 108, and therefore the nature of any updated data obtained from the client device 104, is not directly relevant to the functionality of the system 100. That is, the functionality implemented by the system 100, and particularly the orchestrator server 124, is applicable to a wide variety of data types. Further, within the travel-related example presented here for illustrative purposes, a wide variety of other data may be included in the dataset 404, instead of or in addition to the data shown in FIG. 4. For example, additional payment information may be included (e.g. a credit card expiry date and/or security code). In further examples, the data presented may be stored in different field structures, such as separate fields for first and last names.

As seen in FIG. 4, the payment card field is empty. Further, the passport information indicates that the currently-stored passport is expired. The operator of the mediator device 120, upon viewing the dataset 404, may select the passport and payment card fields and transmit an indication 408 to the target server 108 that updated data is required in connection with those fields to continue the booking process. In response to receiving the indication 408, the target server 108 can generate the above-mentioned request and transmit the request to the orchestrator server 124.

FIG. 4 illustrates an example update request 412 generated by the server 108. The update request 412 is identified by an API call such as "ClaimData" in this example. More generally, the request 412 includes an indication, recognizable by the orchestrator server 124, that it is an update request. The request 412 also includes an identifier of the client device 104, which in the present example is the email address from the dataset 404. The identifier is used by the orchestrator server 124 to contact the client device 104 directly to obtain updated data.

The request 412 also includes an authentication token, in this example. The token is generated by the target server 108, e.g. as a random number, a hash generated from the dataset 404, or the like. The target server 108 may store the token in the repository 116 in association with the dataset 404. The authentication token is employed in the update process, as will be described herein, to authenticate incoming updated data without requiring the client device 104 to provide credentials such as a login ID and password or the like. The request 412 also includes field identifiers corresponding to the portions of the dataset that require updated data. Thus, in the illustrated example, the request 412 indicates that the passport number, passport expiry, and payment card fields are required.

In other examples, the request detected at block 305 by the orchestrator server 124 can be generated automatically at the target server 108, rather than upon receipt of an instruction from the mediator device 120 (e.g. the indication 408). For example, the target server 108 can be configured to determine periodically whether any passport information within the repository 116 indicates expiry of a passport, and to automatically generate an update request in response. In other examples, the orchestrator server 124 itself can generate the update request detected at block 305, e.g. by periodically querying the repository 116 and making the above-mentioned expiry determination locally.

Returning to FIG. 3, at block 310 the orchestrator server 124 is configured to obtain an authentication token and, optionally, a set of validation criteria corresponding to the fields identified in the request detected at block 305. The authentication token, in this example, is obtained from the request 412 itself, having been generated by the target server 108. In other examples, the authentication token can be omitted from the request 412, and generated by the orchestrator server 124 itself.

In this example performance of the method 300, validation criteria are omitted from block 310, however a further example including the use of validation criteria will be discussed further below. In brief, validation criteria define formatting requirements for the updated data to be sought from the client device 104, such as string-length limits, alphanumeric masks, and the like. Validation criteria may also include regular expressions, indications of whether certain fields are mandatory, and the like. The validation criteria, when used, can be obtained from the target server 108 (and may therefore be included in the request 412), or can be stored locally at the orchestrator server 124 in association with corresponding field identifiers.

At block 315, the orchestrator server 124 is configured to generate and transmit a data collection message. The data collection message includes at least one input element to receive updated data at the client device 104, as well as a selectable submission element enabling the client device 104 to transmit the updated data to the orchestrator server 124. The data collection message also includes the above-mentioned authentication token. The data collection message both informs the client device 104 of the need for updated data, and provides a graphical interface permitting the entry and transmission of that updated data back to the orchestrator server 124.

Figure 5:
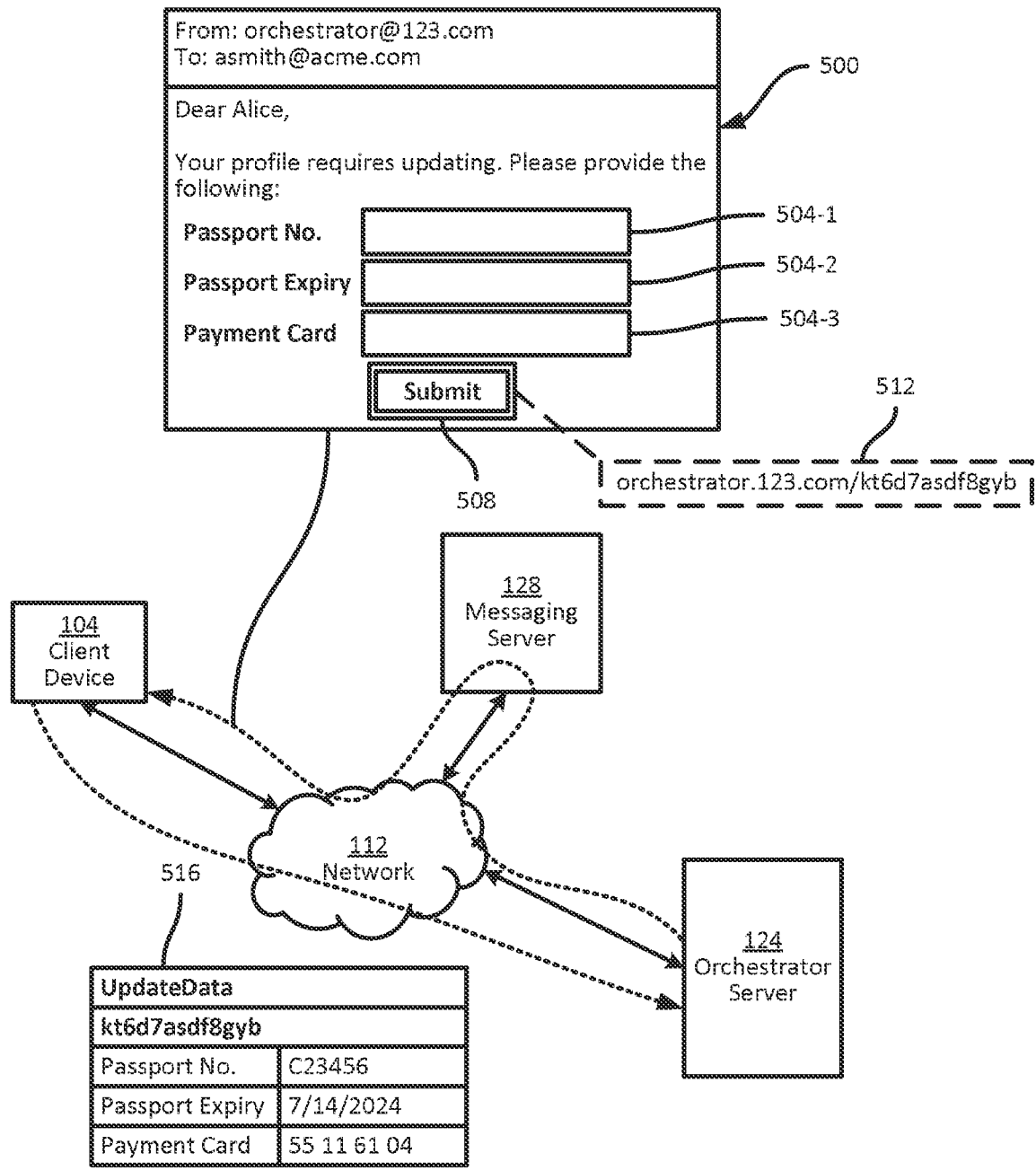
FIG. 5 is a diagram illustrating an example performance of blocks 315-335 of the method of FIG. 3.

Turning to FIG. 5, an example data collection message 500 is shown. In this example, the message 500 is an email message, although in other examples instant messages or other message types may be used instead of email. More specifically, the message 500 includes interactive elements distinguishing the message 500 from a traditional, static email message. The message 500 may employ interactive messaging technology such as that implemented by the actionable message framework mentioned earlier. Other dynamic messaging technologies may also be employed, such as Accelerated Mobile Pages (AMP). The message 500 can, in some examples, be signed or include other information permitting authentication of the source of the message 500, e.g. via Sender Policy Framework (SPF) and/or DomainKeys Identified Mail (DKIM).

The message 500 is addressed to the client device 104 via the client identifier in the request 412. In addition, the message 500 includes input elements 504-1, 504-2, and 504-3 each corresponding to one of the fields identified in the request 412 as requiring updated data. The input elements 504 are selectable at the client device 104, after receipt and rendering of the message 500 at the client device 104, to enable entry of data by an operator of the client device 104.

The message 500 also includes, as noted above, a selectable submission element 508. The submission element, when selected, causes the client device 104 (e.g. a messaging client application executed by the client device 104) to transmit a message to the orchestrator server 124 containing the data entered in the input elements 504. To that end, the message 500 includes, in association with the submission element 508, a network identifier 512 of the orchestrator server 124. In the present example, the network identifier is a domain name, but in other examples the identifier can include an IP address or the like. The network identifier 512 also contains the token in this example. In other examples, the message 500 can include the token as a separate item of information, rather than as part of the network identifier.

The message 500, as shown in FIG. 5, is delivered to the client device 104 via a messaging server 128, such as an email server or a set of email servers, an instant messaging service, or the like. Returning to FIG. 3, at block 320, upon receipt at the client device 104, the message 500 can be presented on a display of the client device 104 (e.g. as shown in FIG. 5).

At block 325, the client device 104 receives updated data via entry into the input elements 504. At block 330 the client device 104 itself can determine whether any validation criteria embedded in the message 500 are satisfied. As validation criteria are omitted from this performance of the method 300, the determination at block 330 is assumed to be affirmative. At block 335, therefore, when the client device 104 detects a selection of the submission element 508, the client device 104 is configured to send a message to the orchestrator server containing the updated data. In implementations that use an actionable message framework, following a negative determination at block 330 the orchestrator server 124 can provide a notification or alert to the client device 104, e.g. by updating the content of an actionable message (e.g. an email). The notification may indicate, for example, that certain input data provided is invalid, and may also clear and/or highlighting the relevant fields.

FIG. 5 illustrates a message 516 sent by the client device 104 to the orchestrator server 124 at block 335. The message 516 is addressed according to the network identifier 512. The message 516 includes an indication that it contains updated data, e.g. in the form of an "UpdateData" API call. The message 516 also includes the token (although as noted above, the token may also be included directly in the network identifier to which the message 516 is directed). Further, the message 516 includes updated data corresponding to each of the input elements 504. The message 516 need not be returned to the orchestrator server 124 via the message server 128. That is, the message 516 is not of the same type (e.g. an email message) as the data collection message 500 itself.

At block 340, the orchestrator server 124 receives the message 516, and is configured to determine whether the token contained in the message 516 matches the token sent with the data collection message at block 315. In some examples, the orchestrator server 124 can check whether the pair of the client identifier (e.g. the email address associated with the client device 104) and the token match a client identifier and token in the message 516, rather than verifying only the email address.

When the determination at block 340 is negative, the message 516 may simply be discarded, and performance of the method 300 may terminate. In some examples, following a negative determination at block 340 an alert or notification may be transmitted to the client device 104. For example, when the actionable message framework mentioned above is employed to obtain the updated data, the orchestrator server 124 may transmit data to the client device 104 to update the content of an actionable message (e.g. an email) to indicate that the token check at block 340 failed, e.g. due to an expired token. When the determination at block 340 is affirmative, however, the orchestrator server 124 proceeds to block 345. At block 345, the orchestrator server 124 initiates an update operation at the target server 108 to place the updated data (received via the input elements 504) in the repository 116. For example, the orchestrator server 124 may send a further API call or other command containing the updated data, and in response the target server 108 may insert the updated data into the repository 116.

Following confirmation from the target server 108 that the repository 116 has been updated, at block 350 the orchestrator server 124 can send an update notification to the client device 104, for presentation at block 355. In some examples, the update notification can include a further message indicating that the update of the repository 116 was successful. In the present example, rather than a further message (e.g. a further email message), the notification takes the form of an update to the interactive elements of the data collection message 500. In particular, the orchestrator server 124 can send a message directly to the client device 104 (e.g. independent of the messaging server 128), containing updated element definitions corresponding to the message 500.

Figure 6:
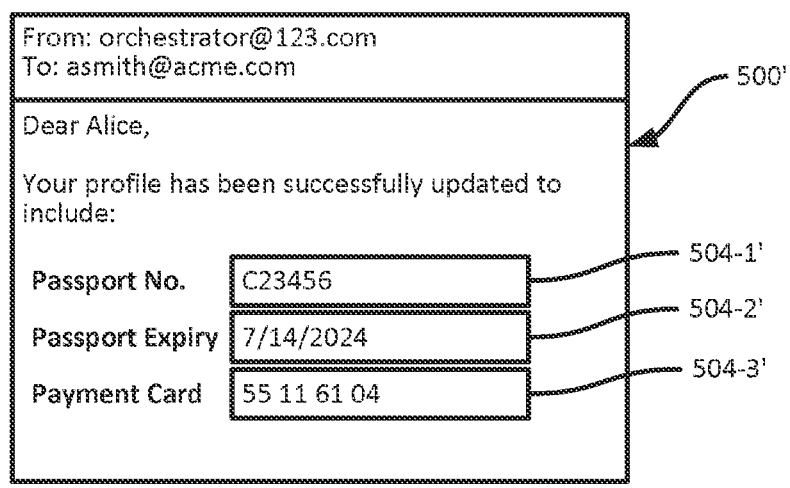
FIG. 6 is a diagram illustrating an example performance of block 355 of the method of FIG. 3.

Turning to FIG. 6, an example of an updated message 500' presented by the client device 104 at block 355 is shown. In particular, the submission element 508 no longer appears, and the input elements 504 have been replaced with input elements 504' that are no longer editable, and instead contain the updated data itself. Further, the body of the message 500' has been updated to indicate that the profile associated with the source entity has been updated.

As mentioned earlier, in some examples, the data collection message can include validation criteria associated with one or more of the input fields 504. For example, turning to FIG. 7, a request 712 is illustrated as received from the target server 108 at block 305 (rather than the request 412). The contents of the request 712 is as shown in FIG. 4, with the exception of validation criteria definitions for two of the three input elements. In particular, the request 712 includes an input mask for the passport expiry element, indicating that a date with a specific format must be input. The request 712 also specifies that the payment card input element must receive numeric data only.

Figure 7:
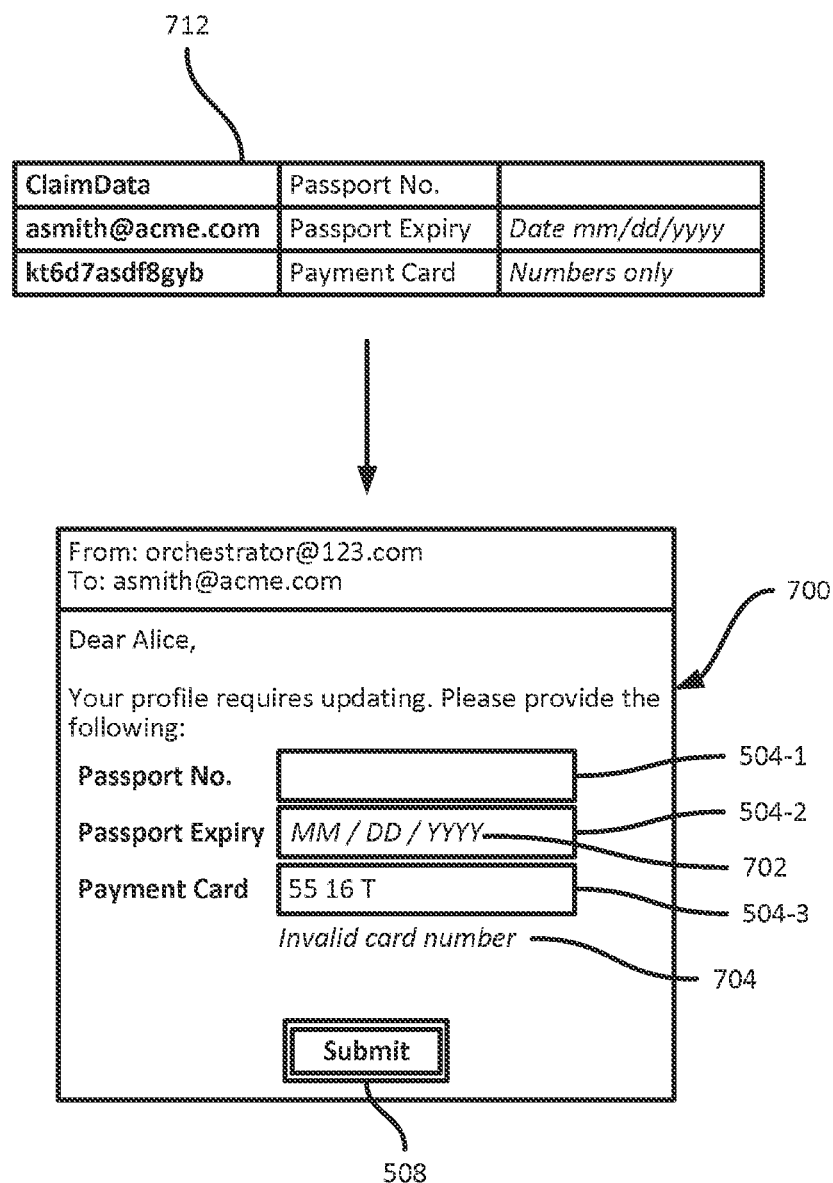
FIG. 7 is a diagram illustrating an alternative data collection message generated at block 315 and presented at block 320 of the method of FIG. 3.

FIG. 7 also illustrates the presentation of a data collection message 700 based on the request 712 at the client device 104 via block 320. The input element 504-2 can be presented along with the edit mask 702, for example. Further, at block 330, when data is input in the element 504-3, the criterion associated with the input element 504-3 is evaluated by the client device 104, and if the criterion is not satisfied (e.g. because a letter has been entered), a warning 704 may be presented in the message 700. The warning 704 may be defined in the validation criteria included in the request 712.

Further variations to the method 300 and/or the system 100 are contemplated, in addition to those mentioned above. As mentioned above, the system 100 and method 300 can be deployed to obtain updated data relating to a wide variety of other processes. For example, the system 100 can be a payment system in which the mediator device 120 is a merchant device such as a point-of-sale terminal, and the target server 108 is a settlement server, e.g. operated by a bank, payment network or the like. The updated data to be obtained from the client device 104 can include, for example, a security code (e.g. CVV) for a payment card presented to the mediator device 120 and conveyed to the target server 108. That is, the system 100 and method 300 can be deployed for real-time transaction execution. In other examples, various other types of data can be updated via the method 300, including human-resources-related information such as medical information, banking information, and the like.

The scope of the claims should not be limited by the embodiments set forth in the above examples, but should be given the broadest interpretation consistent with the description as a whole.

The invention claimed is:

1. A method in an orchestrator server, the method comprising:
receiving, from a target server, a request to obtain updated data from a client computing device, the updated data for storage in a dataset corresponding to the client computing device, the request including an authentication token generated at the target server;
retrieving, from the dataset, a client identifier of the client computing device;
in response to receiving the request, generating an interactive data collection message including (i) an input element for display at the client computing device to receive the updated data, (ii) a submission element selectable at the client computing device and including a network identifier of the orchestrator server, and (iii) the authentication token;
transmitting the interactive data collection message for delivery to the client computing device using the client identifier;
responsive to (i) entry of the updated data via the input element at the client computing device, and (ii) selection of the submission element at the client computing device, receiving, from the client computing device, a message addressed using the network identifier of the orchestrator server and containing the updated data and the authentication token; and
providing the updated data to the target server for updating the dataset.

2. The method of claim 1, wherein receiving the request includes receiving the request from the target server storing a repository containing the dataset.

3. The method of claim 2, wherein updating the dataset includes: sending an update command to the target server, containing the updated data.

4. The method of claim 2, further comprising, at the target server:
providing the dataset to a mediator computing device;
receiving a command from the mediator computing device to obtain the updated data; and
generating the request in response to receiving the command.

5. The method of claim 1, wherein the dataset includes a plurality of fields;
wherein the request includes at least one field identifier; and
wherein the data collection message includes respective input elements for each field identifier.

6. The method of claim 5, wherein generating the data collection message further comprises:
retrieving validation criteria corresponding to each of the field identifiers; and
embedding the validation criteria in the data collection message.

7. The method of claim 1, wherein the request includes a first application programming interface (API) call invoking a data collection operation; and
wherein the data collection message includes, in association with the selectable submission element, a second API call invoking an update operation.

8. An orchestrator server, comprising:
a memory;
a communications interface; and
a processor configured to:
receive, from a target server, a request to obtain updated data from a client computing device, the updated data for storage in a dataset corresponding to the client computing device, the request including an authentication token generated at the target server;
retrieve, from the dataset, a client identifier of the client computing device;
in response to receiving the request, generate an interactive data collection message including (i) an input element for display at the client computing device to receive the updated data, (ii) a submission element selectable at the client computing device and including a network identifier of the orchestrator server, and (iii) the authentication token;
transmit the interactive data collection message for delivery to the client computing device using the client identifier;
responsive to (i) entry of the updated data via the input element at the client computing device, and (ii) selection of the submission element at the client computing device, receive, from the client computing device, a message addressed using the network identifier of the orchestrator server and containing the updated data and the authentication token; and
provide the updated data to the target server to update the dataset to include the updated data.

9. The orchestrator server of claim 8, wherein the processor is configured, in order to receive the request, to receive the request from the target server storing a repository containing the dataset.

10. The orchestrator server of claim 9, wherein the processor is configured, in order to update the dataset, to: send an update command to the target server, containing the updated data.

11. The orchestrator server of claim 8, wherein the dataset includes a plurality of fields;
wherein the request includes at least one field identifier; and
wherein the data collection message includes respective input elements for each field identifier.

12. The orchestrator server of claim 11, wherein the processor is configured, in order to generate the data collection message, to:
retrieve validation criteria corresponding to each of the field identifiers; and
embed the validation criteria in the data collection message.

13. The orchestrator server of claim 8, wherein the request includes a first application programming interface (API) call invoking a data collection operation; and
wherein the data collection message includes, in association with the selectable submission element, a second API call invoking an update operation.

* * * * *